E. G. & A. E. QUICKEL.
LIME SPREADER.
APPLICATION FILED FEB. 11, 1911.

1,010,454.

Patented Dec. 5, 1911.

2 SHEETS—SHEET 1.

Witnesses
Edwin L. Yewell

Inventors
Edwin G. Quickel
By Allen E. Quickel
Davis & Davis
Attorneys

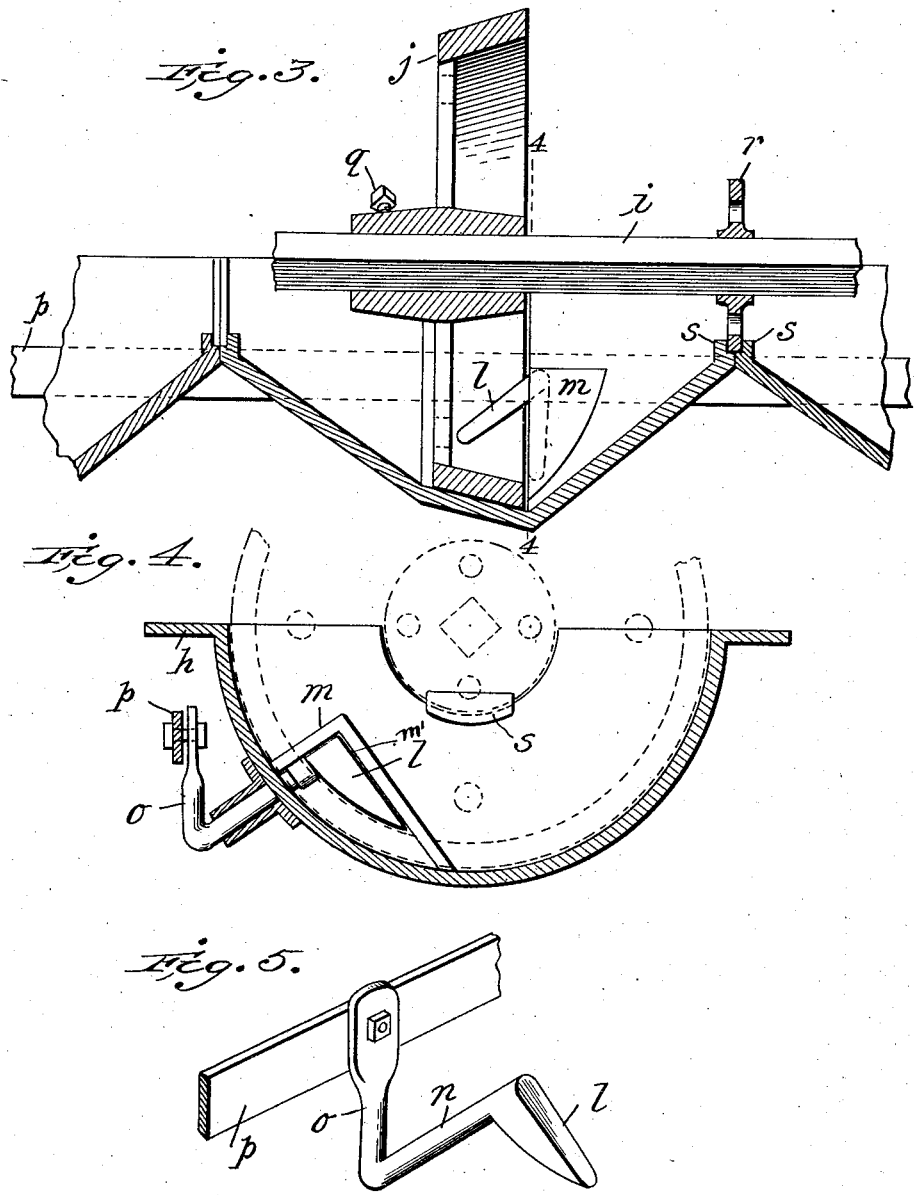

UNITED STATES PATENT OFFICE.

EDWIN G. QUICKEL AND ALLEN E. QUICKEL, OF YORK, PENNSYLVANIA.

LIME-SPREADER.

1,010,454. Specification of Letters Patent. Patented Dec. 5, 1911.

Application filed February 11, 1911. Serial No. 607,948.

*To all whom it may concern:*

Be it known that we, EDWIN G. QUICKEL and ALLEN E. QUICKEL, citizens of the United States, and residents of York, in the county of York and State of Pennsylvania, have invented certain new and useful Improvements in Lime-Spreaders, of which the following is a full and clear specification, reference being had to the accompanying drawings, in which—

Figure 1:
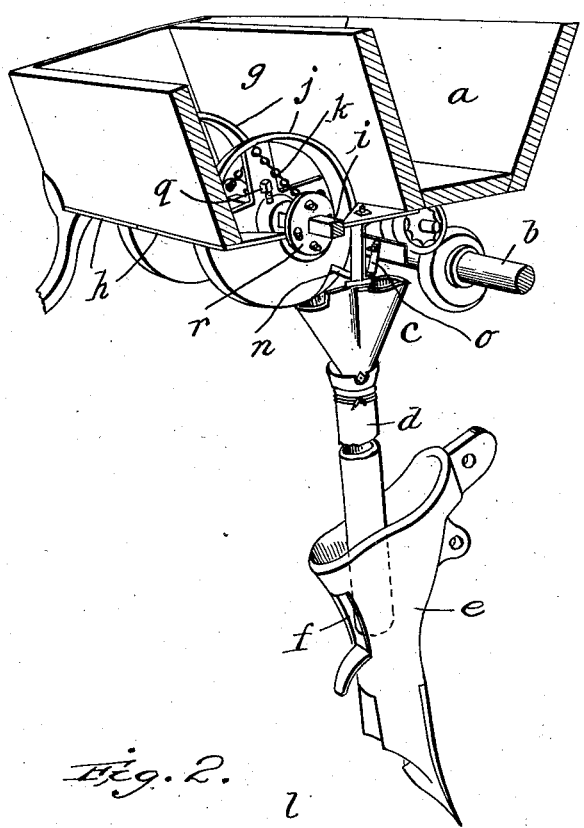
Figure 2:
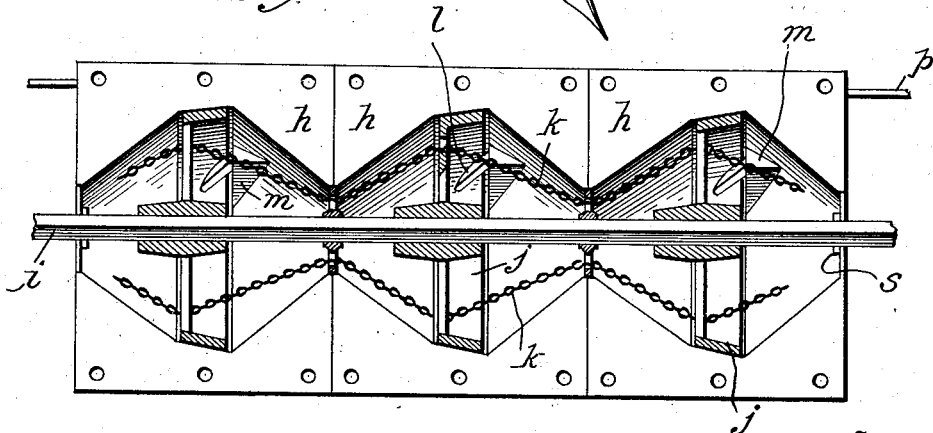

Figure 1 is a transverse section of the hopper of a combined seeder and fertilizer distributer, showing our invention applied thereto; Fig. 2 a plan view of the interior of the bottom of the fertilizer hopper, the stirring mechanism being shown in horizontal section; Fig. 3 a vertical sectional view of a portion of the hopper bottom and one of the stirring wheels; Fig. 4 a transverse section on the line 4—4 of Fig. 3; Fig. 5 a detail perspective view of one of the discharging scrapers.

The object of this invention is to provide simple and efficient mechanism for distributing fertilizing material, this mechanism being especially adapted for use in combination with a seed drill, as more fully hereinafter set forth.

In the drawing, $a$ designates the seed hopper, $b$ the shaft of the seed discharging mechanism and $c$ the funnel of the seed spout $d$, all of which may be of any suitable and well known construction.

$e$ designates a drill tooth or boot which is of the usual construction except that at its rear side it is provided with an opening $f$ which serves as a window or peep opening to enable the operator to ascertain at a glance whether or not the dropping mechanism of the seeder and the fertilizer distributer are working properly, said opening $f$ being co-incident with the lower end of the seed spout when the drill or boot is working at its usual depth.

The fertilizer hopper $g$ is arranged just back of the seed hopper and the discharging mechanism thereof is so arranged that the fertilizer is discharged into each one of the funnels $c$ along with the grain that comes down from the seed hopper, so that the fertilizer and the grain will be commingled in the act of depositing them upon the ground. The hopper bottom consists of a series of plates $h$ bolted to the side pieces of the hopper and arranged with their edges closely abutting, this series of plates extending throughout the length of the hopper. The bottom is provided with a longitudinal channel or depression through which the angular shaft $i$ extends, this shaft being adapted to be rotated by any of the usual mechanisms and being provided with the stirring mechanism, which mechanism consists of a series of wheels $j$ and a series of chains $k$, the chains extending through the radial spokes of the wheels and running from one end of the hopper to the other.

The channel in each of the plates $h$ is centrally depressed, and one of the wheels $j$ works in each one of these depressions, the periphery of the wheel being inclined and the bottom of the depression being correspondingly inclined. The walls of each pocket or depression at opposite sides of the wheel incline downwardly and inwardly toward the deepest part of the pocket so as to cause the fertilizer at both sides of the open wheel to gravitate and deposit itself upon the inclined inner face of the wheel rim, this rim being made considerably wider than the spokes so as to form a ledge or carrier for the fertilizer deposited thereon. As the wheel rotates the fertilizer deposited on the rim is carried upwardly; and as it moves upwardly it strikes against a deflector $l$ which extends inwardly in an inclined direction across the inner face of the wheel rim and causes a deflection of the fertilizing material out through a lateral opening $m'$ in the pocket, this opening being formed in an inwardly extending hood-like portion $m$ of the hopper bottom. The deflector $l$ is carried on the inner end of a shaft $n$ journaled in the hopper bottom and provided with an upstanding arm $o$ at its outer end. The upstanding arms $o$ of all the deflectors are connected to a suitable rod $p$ whereby the deflectors may all be simultaneously adjusted, the adjustment of the deflector determining the amount of material fed through the openings. The openings are arranged just over the funnels $c$ of the grain spouts. It will be observed that the openings are triangular in shape and the deflectors are similarly shaped so that when the deflectors are swung entirely off the rims of the wheels they will serve as closure devices for the openings.

Each of the wheels $j$ is fastened rigidly to the shaft $i$ by a set-screw or bolt $q$ so that it may be adjusted to run truly with respect to the central portion of its pocket and the discharger. There are four of the chains *k* and they are arranged to extend in a zigzag direction longitudinally through the hopper. They extend through openings in the spokes of the wheels near the rims thereof and through openings in small disks or plates *r* carried by the shaft *i* at points intermediate of the wheels. These disks *r* are arranged respectively in line with the divisions of the hopper bottom sections. They are slidably mounted on the shaft but rotate with it. They are prevented from longitudinal movement on the shaft by engagement between lugs *s* formed on the respective hopper sections. The chains are drawn taut so as to have little or no longitudinal movement with respect to the wheels and the disks *r*, and by reason of their connection to the wheels at points near the rims thereof, they are carried down into each of the pockets, so that they are thereby caused to effectively assist the wheels in stirring the fertilizer material, preventing it caking around the wheels and the discharge openings.

Having thus fully described our invention, what we claim as new and desire to secure by Letters Patent, is—

1. In a fertilizer distributer, a hopper whose bottom is formed with a series of depressions whose walls incline toward the deepest part of each depression, one of the walls of each depression being provided with a lateral discharge opening, a shaft extending through the hopper and provided with a series of open wheels depending into said depressions, each wheel having a rim flange working close to the bottom of the depression at one side of the aforesaid discharge opening, a closure device pivoted in each of said openings and adapted to swing inwardly across the inner face of the rim flange of the adjacent wheel to serve as a deflector to direct the fertilizing material out through said opening, and means for simultaneously adjusting said combined closure and deflecting devices.

2. In a fertilizer distributer, a hopper whose bottom is formed with a series of depressions whose walls incline toward the deepest part of each depression, each of said depressions having a hood-like projection extending inwardly from one of the inclined walls, a shaft extending through the hopper and carrying a series of wheels one of which depends into each of said depressions or pockets, each of these wheels being provided with a rim-flange inclining toward the open inner end of said hood, a pivoted closure-device for the opening in each of said hoods, this closure device being adapted to be swung inwardly onto the rim flange of the wheel to form a scraper or deflector to deflect the material out through said opening as the wheel rotates, and means for shifting said closure devices.

3. In a fertilizer distributing machine, the combination of a hopper having in its bottom a series of depressions, the walls of each depression inclining downwardly toward the deepest part thereof, one of the walls of each depression being provided with a lateral discharge opening, a shaft extending through the hopper and provided with a series of open wheels depending into said depressions, each wheel having an inclined rim-flange working close to the similarly inclined bottom of the depression and at one side of the aforesaid discharge opening, the said rim flange inclining toward said discharge opening, a closure device pivoted in each of said openings and adapted to swing inwardly across the inner face of the rim flange of the adjacent wheel to deflect the material out through said opening, and means for simultaneously adjusting said combined closure and deflecting devices.

In testimony whereof we hereunto affix our signatures in the presence of two witnesses this ninth day of February, 1911.

EDWIN G. QUICKEL.
ALLEN E. QUICKEL.

Witnesses:
GEORGE L. SPRENKEL,
SAMUEL S. HAY.

Copies of this patent may be obtained for five cents each, by addressing the "Commissioner of Patents, Washington, D. C."